Aug. 13, 1968

D. I. COLE 3,396,580

STORAGE AND RELEASE APPARATUS FOR MEASURING DEVICES

Filed July 25, 1966

Inventor:
Douglas I. Cole,
by Paul A. Frank
His Attorney.

Aug. 13, 1968     D. I. COLE     3,396,580

STORAGE AND RELEASE APPARATUS FOR MEASURING DEVICES

Filed July 25, 1966     4 Sheets-Sheet 3

Inventor:
Douglas I. Cole,
by Paul A. Frank
His Attorney.

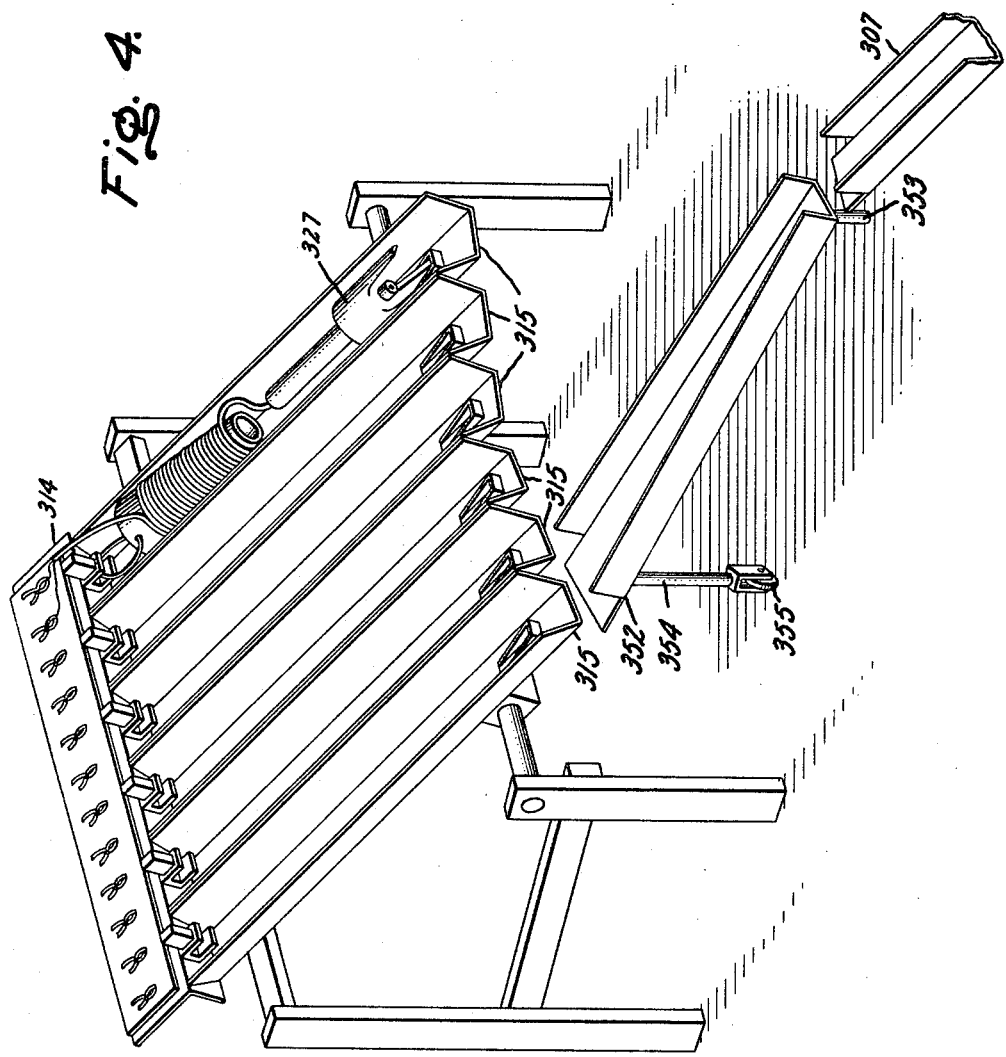

United States Patent Office 3,396,580
Patented Aug. 13, 1968

3,396,580
STORAGE AND RELEASE APPARATUS FOR MEASURING DEVICES
Douglas I. Cole, Lyndhurst, Ohio, assignor to General Electric Company, a corporation of New York
Filed July 25, 1966, Ser. No. 567,681
6 Claims. (Cl. 73—343)

This invention relates to a support and release apparatus and in particular to a support and release apparatus for electrical measuring devices, such as thermocouple units.

Expendable thermocouple units have proven satisfactory for taking a temperature measurement of molten metal in an open hearth type furnace and many thousands of such units have been used in connection with the production of steel in furnaces of this type. The open hearth-type furnace usually provides ready access so that a lance carrying a thermocouple unit may be inserted into the furnace a sufficient distance to immerse the unit in the molten metal.

Such ready access to a bath of molten metal is not provided in furnaces utilized for carrying out the basic oxygen process for making the steel. Such furnaces are tiltable vessels of substantial depth and are supported in an upright position while the steel making process is being carried out. A hood is disposed over the open top or mouth of the furnace in the upright position of the latter for conveying fumes and smoke to the stack. An oxygen-conveying lance extends through an opening in the wall of the hood into the furnace and terminates in the steel bath or immediately above the slag layer floating on the bath of molten metal partially filling the furnace. In order to utilize thermocouple units of the type heretofore available it has been necessary to remove the oxygen lance from the furnace and tilt the furnace to shift its mouth from beneath the hood in order to thrust the thermocouple unit mounted on a lance into the furnace so as to immerse it in the bath of molten metal. Thereafter, the furnace is usually returned to an upright position and the process is continued.

The above has proved to be an impractical maneuver for many reasons, including interruption of the steel-making process which adds considerably to the cost of manufacture of the steel.

It has been proposed heretofore to dispense with the lance and sleeve of the commerciably available equipment and to provide an iron weight accommodating a commercial thermocouple assembly for effectively immersing the thermocouple assembly in the molten metal bath. An extension cord including mutually insulated conductors is electrically connected at one end to lead wires which in turn are connected to the thermocouple element of the assembly. The cord is adapted at its opposite end for connection with a temperature measuring and recording apparatus. The weighted thermocouple assembly with the cord is placed upon a stationary chute directed into an opening in the furnace hood and upon release the unit falls freely and sinks into the bath of molten metal. An example of a new and improved expandible immersion thermocouple unit is disclosed in the copending application of Douglas I. Cole, Ser. No. 421,016 filed Dec. 24, 1964, and assigned to the assignee of the present application.

Because the furnace is quite large, the point of connection and release of the expendible thermocouple unit into the bath of molten metal is located on an elevated service floor. Ordinarily, whenever a temperature reading is required, an operator must rather inconveniently go up to the service floor, properly connect the thermocouple unit and release the unit manually into the molten metal bath. Since the desired reading is available a very short time thereafter, a second operator may be required to situate himself at the recording apparatus to obtain the desired temperature information. Since a number of temperature readings may be necessary during the course of the steel-making process, this procedure can become quite cumbersome and time-consuming.

One object of my invention is to provide a semi-automatic storage and release apparatus for an electrical measuring device which is capable of storing and automatically releasing a number of such units.

It is a further object of this invention to provide a semi-automatic storage and release apparatus for an electrical measuring device which can be remotely controlled by a single operator.

In carrying out the objects of my invention in one form thereof, I provide a storage and release apparatus, including a supporting frame and a plural unit storage member supported thereby. A number of thermocouple units are respectively positioned within spaced channel members in the storage member. Each unit is connected through an extension cord and suitable connectors to a remotely situated control panel. At this point, selective release of the thermocouple units may be controlled remotely by an operator at the control panel.

Thus, the storage and release of a number of thermocouple units may be remotely controlled, thereby resulting in more convenient and efficient operation.

Other objects and advantages of my invention may better be understood by reference to the following description taken in connection with the accompanying drawings in which:

FIGURES 3 and 4 are isometric views of the overall steel-making process illustrating modifications of applicant's invention.

Figure 1:
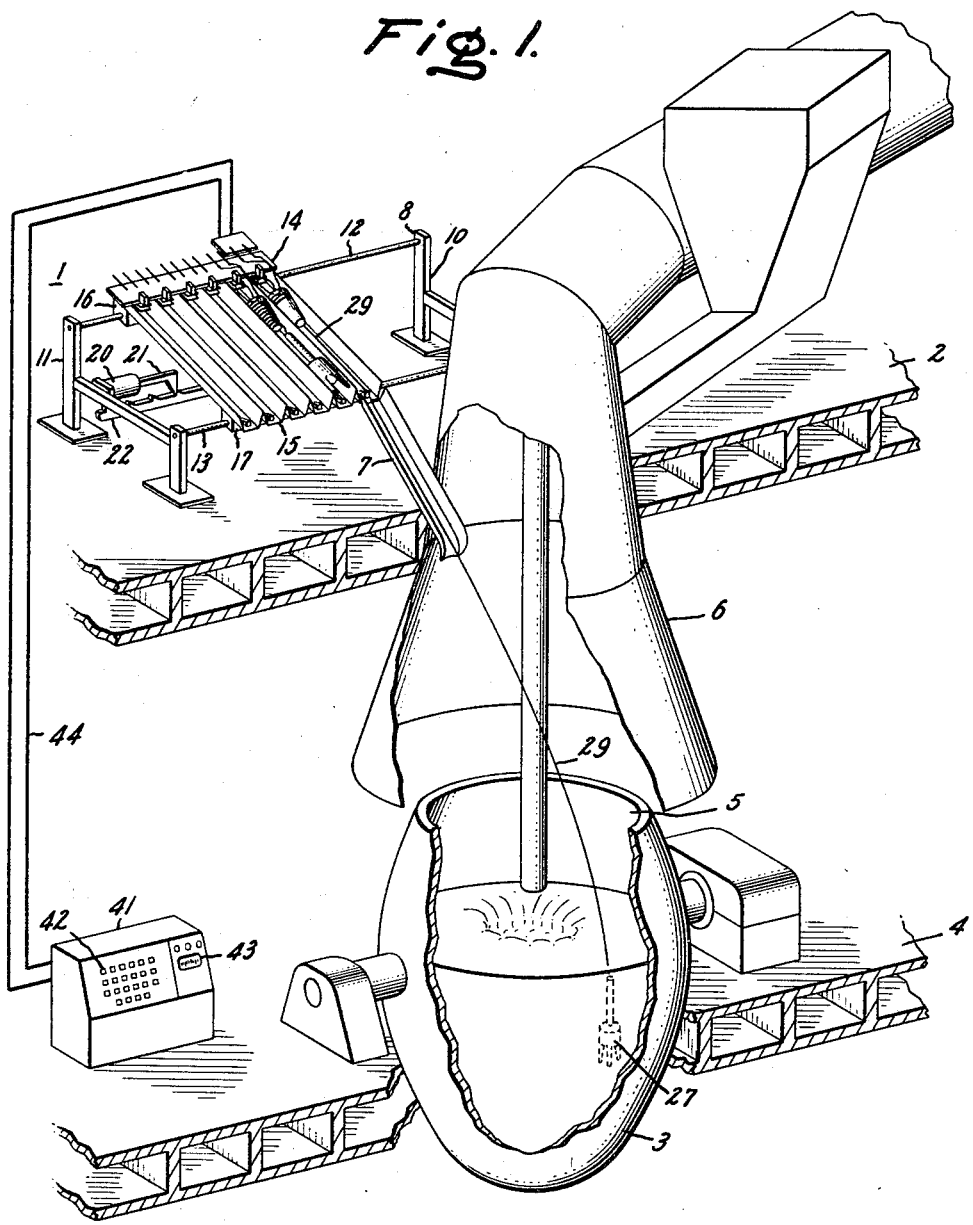
FIGURE 1 is an isometric view showing the overall steel-making process illustrating a preferred form of applicant's invention.
Figure 2:
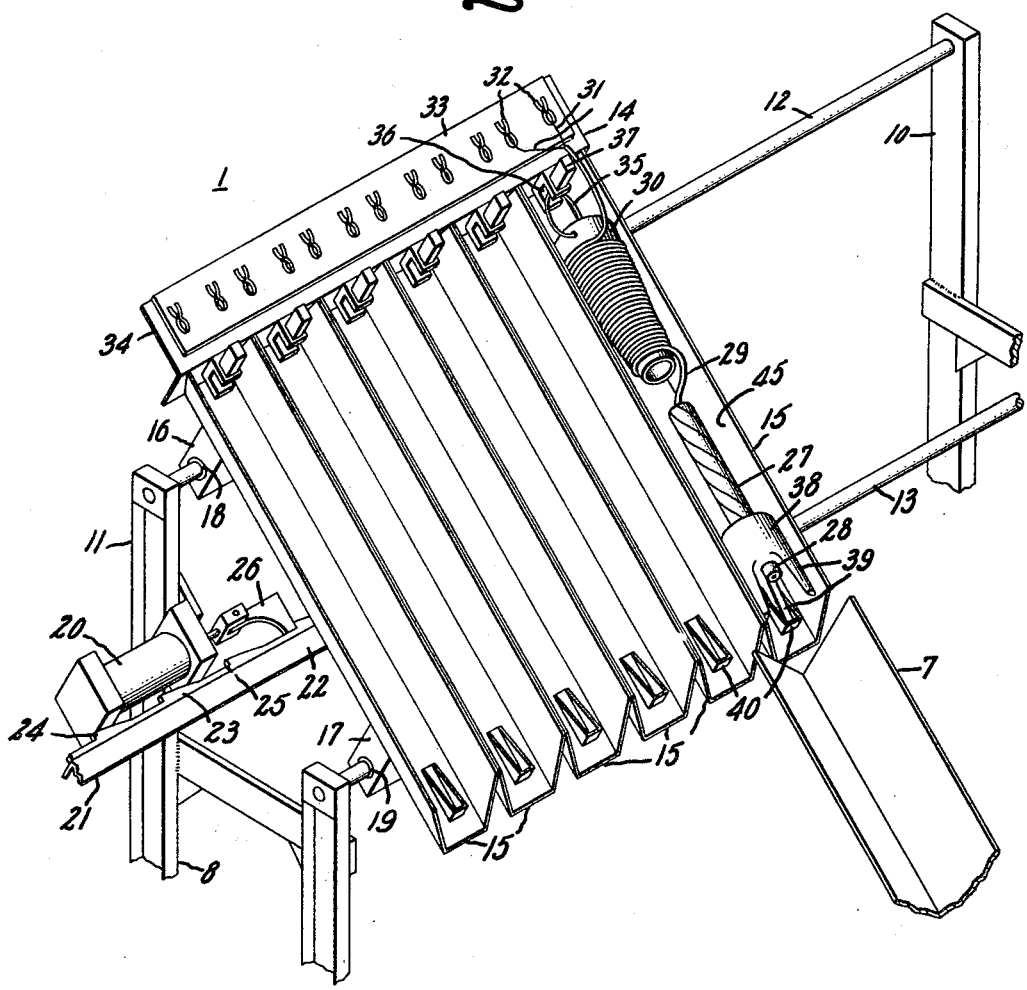
FIGURE 2 is an isometric view showing one form of applicant's invention.

FIGURES 1 and 2 show the invention in one form and as a part of the overall steel-making process. The storage and release apparatus 1 is shown mounted high on a service floor 2. Furnace 3 is positioned below the service floor on floor 4 and includes an open mouth 5. A hood 6 is disposed over the mouth of the furnace in the upright position of the latter for conveying fumes and smoke to a suitable stack. A stationary chute 7 is disposed within an aperture in the hood so as to provide access to the molten metal below.

The storage and release apparatus 1 includes a supporting frame 8 which supports a plural unit storage member 14. The supporting frame 8 includes a pair of spaced members 10 and 11 which support parallel, horizontally oriented rods 12 and 13. The storage member 14 includes a number of spaced channel members 15. The storage member 14 is mounted at an angle inclined with respect to the horizontal by means of bushings 16 and 17 disposed on the underside of channel members 15. The bushings have apertures 18 and 19 therein which receive the horizontally oriented rods 12 and 13 respectively so that the storage member 14 may freely move in a horizontal direction along the rods.

The supporting frame 8 also carries an air cylinder 20 which cooperates with a ratchet mechanism 21 mounted on the underside of storage member 14 to selectively move the storage member along the rods 12 and 13. The ratchet mechanism includes a bar 22 which carries a saw-tooth cam 23. The cam 23 includes a number of alternate ridges 24 and shallow notches 25. A pusher rod or spring loaded roller 26 operated by the air cylinder 20 serves to index the storage member 14 into position. The storage member 14 is advanced by the air cylinder 20 which pushes against the saw-tooth cam 23. When the air cylinder 20 retracts the pusher rod 26 rides up and over the next ridge 24 and then drops into position in notch 25. This serves to align a channel member 15 with the stationary chute 7 leading into the molten metal vessel 3.

A temperature responsive device such as a thermocouple unit, shown generally at 27, includes a thermocouple 28 having an extension cord 29 attached to it at one end. The extension cord is then wound around a cone-shaped stiff support 30. Two mutually insulated conductors 31 extend from the end of the extension cord 29 and are received by suitable connecting means, such as alligator clips 32 mounted on a bar 33 made from electrically insulating material and attached to L-shaped member 34. The support 30 includes a retaining loop 35 disposed in an aperture 36 near one end. The support 30 is retained in the channel member 15 by means of a solenoid-operated pin 37 which engages a portion of the retaining loop 35.

The thermocouple unit 27 includes a metal weight 38 affixed to the thermocouple 28 and having a series of spaced prongs 39. The thermocouple unit 27 is retained in the channel member 15 by means of a solenoid-operated unit release mechanism 40 which engages one of the spaced prongs 39.

A control panel 41 is provided on which are push-button controls, shown generally at 42, to control the operation of the solenoid-operated unit release mechanism 40, the solenoid-operated pin 37, and the air cylinder 20. The control panel 41 also includes a recorder 43 to receive a transmitted signal from the thermocouple 28. The recorder 43 is electrically connected to alligator clips 32 on the storage member 14 by means of conductors 44.

The storage and release apparatus 1 operates as follows: An operator moves storage member 14 into the position where side 45 thereof is aligned with stationary chute 7. A thermocouple unit 27 is then deposited in each channel member 15 so that one prong thereof is retained by release mechanism 40. The retaining loop 35 extending from the support 30 is engaged with the solenoid-operated pin 37 at the top of the channel member. In this position the storage and release apparatus may be remotely operated by an operator situated at the control panel 41. When a temperature reading is desired, the operator causes the unit release mechanism 40 of the channel member 15 to be operated by solenoid actuation thereof, whereby the thermocouple unit 27 is released into the stationary chute 7, causing it to drop and sink into the molten metal bath. Cord 29 and support 30 are retained so that signal from the thermocouple 28 is relayed through connectors 32 to the recorder 43 on control panel 41. At the end of the recording or measuring cycle the operator depresses a support release button to actuate the solenoid-operated pin 37. At this time the measuring circuit opens as a result of the support 30 falling down the channel 15 and stationary chute 7 and into the molten bath, and pulling the conducting wires 31 from the alligator clips 32.

When a second temperature measurement is desired, the operator depresses a storage member advance button (not shown). Storage member 14 is advanced by air cylinder 20 through pusher rod 26 which rides up and over the next ridge 24 and drops into shallow notch 25. This operation aligns the next channel member with stationary chute 7. At the same time a conventional relay switching circuit (not shown) is operated to connect the terminals of the next thermocouple unit to the recording meter 43. This procedure is repeated so that the thermocouple units in the channel members are released as desired.

Figure 3:
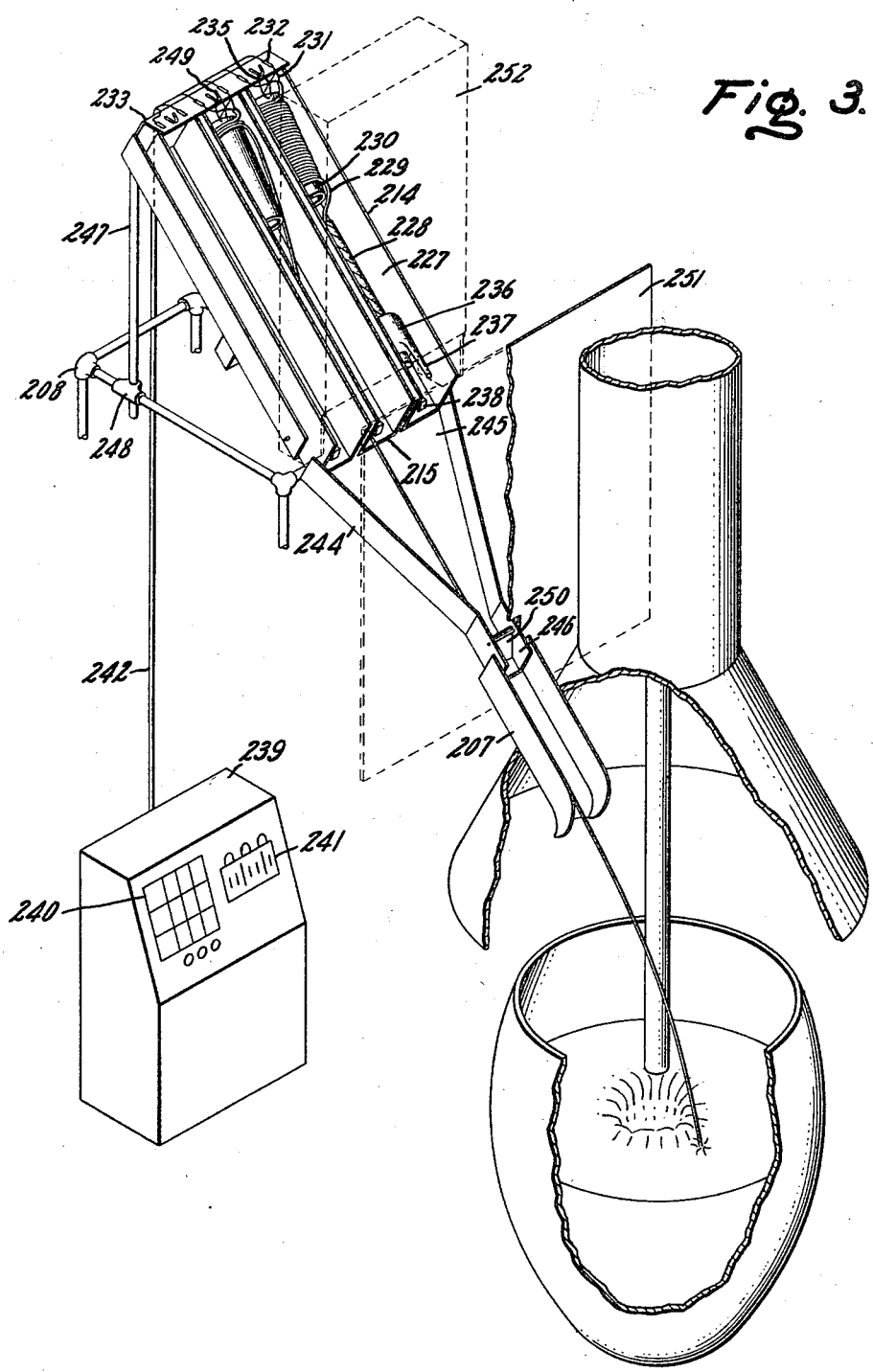

FIGURE 3 shows a modification of the invention. In this modification, a pivotally-mounted chute 244 is provided which includes an entrance 245 as wide as the number of channel members 215 in the storage member 214 and an outlet 246 aligned with the opening of the stationary chute 207. The modified apparatus includes a supporting frame 208 for a three-channel storage member 214. The supporting frame 208 includes a U-shaped support bar 247 which may be vertically adjusted by suitable adjusting means 248 to vary the inclination of storage member 214. Hooks 249 are fixed to a top portion 233 of the storage member 214. Each hook is adapted to receive a loop 235 from a support 230 so as to retain a thermocouple unit 227. Mutually insulated conductors 231 extend from cord 229. Connectors such as alligator clips 232 are disposed at the top portion of storage member 214. A solenoid-operated unit release mechanism 238 provided in each channel member 215 engages a prong 237 of the metal weight 236 affixed to the thermocouple 228.

A pivotally-mounted gate 250 may be provided at outlet 246 of chute 244. A heat shield in the form of plate 251 may also be provided at the outlet of chute 244. Additionally, a storage member cover 252 (dotted lines) may be provided to protect the thermocouple units 227 once they have been deposited in the channel members 215. Suitable conductors 242 lead to a remotely situated control panel 239 having operating controls 240 and a recording or measuring instrument 241 thereon.

The modified form of the invention operates as follows: An operator deposits a thermocouple unit 227 in each channel member 215 so as to engage the unit release mechanism 238 with a prong 237 on the metal weight 236. The hook member 249 is then engaged with the loop 235 extending from the support 230 and conductors 231 are connected to alligator clips 232. The storage member cover 252 may then be rotated to cover the thermocouple units 227 therein. When a temperature measurement is desired, an operator actuates the unit release mechanism 238 for any of the channel members 215, whereby the thermocouple unit 227 is released from the channel member and is received in chute 244. The thermocouple unit slides down through stationary chute 207 and is delivered into the molten metal bath at 203. A measurement is then recorded on recorder instrument device 241. When additional temperature measurements are desired the operator merely repeats the above procedure until the supply of thermocouple units is exhausted. As each unit release mechanism is actuated a relay switching circuit is operated to connect the terminals of the actuated thermocouple unit to the recording switch 241.

In FIGURE 4, a pivotal chute 352 is provided to connect stationary channel storage member 314 with the stationary furnace chute 307. The chute pivots about pin 353 and is supported for movement by means of pin 354 and caster 355. Through a suitable control means (not shown) the chute 352 may be aligned with any channel member 315 prior to release of a thermocouple unit 327 so as to provide the desired path into the bath of molten metal.

I have thus described a semi-automatic apparatus for storage and automatic release of an electrical measuring instrument connected thereto by means including a conducting cord, so that, after release of the measuring instrument, a measuremet may be received by a suitable recording device in electrical contact therewith. While the invention has been described with specific examples, it is the aim of the appended claims to cover all such equivalent variations as come within the true spirit and scope of the foregoing disclosure.

What I claim as new and desire to secure by Letters Patent of the United States is:

1. A storage and release apparatus for an electrical measuring device including a conducting cord having one of its ends connected to the device and being connected to a support near its other end comprising:
 (a) a supporting frame;
 (b) a storage unit supported at an inclined angle by said frame and including a series of spaced channel members;
 (c) first means to retain a device when positioned in one of said channel members;
 (d) second means to retain said support when a device is positioned in one of said channel members;
 (e) guide means permitting a device to fall in a desired direction; and
 (f) a control device electrically connected to said other end of said conducting cord, said control device including recording means for receiving a signal from a measuring device and including control means for selectively controlling said first means.

2. The storage and release apparatus as defined in claim 1 wherein said second means comprise an automatically operated locking device, and including control means in said control device for selectively controlling said locking device.

3. The storage and release apparatus as defined in claim 1 wherein said guide means comprises an automatically operated positioning device to selectively orient any one of said channel members in a desired position prior to release of its measuring device, and including control means in said control device for selectively controlling said positioning device.

4. The storage and release apparatus of claim 2 wherein said guide means comprise an automatically operated positioning device to selectively orient any one of said channel members in a desired position prior to release of said measuring device and including control means in said control device for selectively controlling said guide means.

5. In a storage and release apparatus for an expendable electrical measuring device of the type having a parameter measuring means to be discharged into a region where a measurement is desired and flexible leads connected between such measuring means and a recording means, the combination comprising
 a supporting frame;
 a plurality of parallel inclined chutes supported by said frame;
 each of said chutes including means for retaining and selectively releasing a parameter measuring means;
 means on said frame for detachably connecting the leads of each measuring device to a recording means;
 and means cooperating with each chute for directing a parameter measuring means upon its release to a region where a measurement is to be made.

6. The combination of claim 5 which includes indexing means for selectively aligning a chute with said cooperating means, parameter indicating means, and switching means for connecting the leads of a selected measuring device with said indicating means.

References Cited
UNITED STATES PATENTS

| | | | |
|---|---|---|---|
| 3,246,519 | 4/1966 | Dornberger | 73—359 XR |
| 3,250,125 | 5/1966 | Bonn | 73—359 XR |
| 3,327,531 | 6/1967 | Fradeneck | 73—359 |
| 3,347,099 | 10/1967 | Schraeder | 73—359 |

DAVID SCHONBERG, *Primary Examiner.*

FREDERICK SCHOON, *Assistant Examiner.*